(12) United States Patent
Moy et al.

(10) Patent No.: US 12,479,571 B2
(45) Date of Patent: Nov. 25, 2025

(54) SYSTEM OF AN ELECTRIC AIRCRAFT WITH PITCH CONTROL USING AN ELEVATOR

(71) Applicant: BETA AIR, LLC, South Burlington, VT (US)

(72) Inventors: Nicholas Moy, South Burlington, VT (US); Collin Freiheit, South Burlington, VT (US); Riley Griffin, South Burlington, VT (US)

(73) Assignee: BETA AIR LLC, South Burlington, VT (US)

( * ) Notice: Subject to any disclaimer, the term of this patent is extended or adjusted under 35 U.S.C. 154(b) by 0 days.

(21) Appl. No.: 18/513,788

(22) Filed: Nov. 20, 2023

(65) Prior Publication Data

US 2024/0228021 A1    Jul. 11, 2024

Related U.S. Application Data

(63) Continuation of application No. 18/095,776, filed on Jan. 11, 2023, now Pat. No. 11,866,152.

(51) Int. Cl.
*B64C 13/04* (2006.01)
*B64C 29/00* (2006.01)
*G05D 1/00* (2006.01)

(52) U.S. Cl.
CPC ........ *B64C 13/042* (2018.01); *B64C 29/0008* (2013.01); *G05D 1/0808* (2013.01)

(58) Field of Classification Search
CPC .... B64C 29/0025; B64C 13/04; G05D 1/0858
See application file for complete search history.

(56) References Cited

U.S. PATENT DOCUMENTS

| | | | |
|---|---|---|---|
| 3,972,490 A | 8/1976 | Zimmermann | |
| 6,467,726 B1 | 10/2002 | Hosoda | |
| 10,101,719 B1 | 10/2018 | Kroo | |
| 10,633,058 B1* | 4/2020 | Rawdon | B63B 15/0083 |
| 11,273,911 B2 | 3/2022 | Brand | |

(Continued)

FOREIGN PATENT DOCUMENTS

| | | |
|---|---|---|
| EP | 4063261 A1 | 9/2022 |
| FR | 2903658 A | 1/2008 |
| WO | WO2018106384 A1 | 6/2018 |

OTHER PUBLICATIONS

Office Action for U.S. Appl. No. 168/095,776, mailed May 18, 2023, 16 pages.

(Continued)

*Primary Examiner* — Timothy D Collins
*Assistant Examiner* — Terri L Filosi
(74) *Attorney, Agent, or Firm* — Lee & Hayes, P.C.

(57) ABSTRACT

A system of an electric aircraft with pitch control using an elevator is presented. In some embodiments, the electric aircraft may include an elevator configured to deflect. In some embodiments, the electric aircraft may further include a lift lever configured to generate a lift command upon activation by a pilot. In some embodiments, the electric aircraft may further include a flight controller communicatively connected with the lift lever and the elevator, wherein the flight controller is configured to receive the lift command from the lift lever and adjust the elevator as a function of the lift command.

20 Claims, 7 Drawing Sheets

(56) References Cited

U.S. PATENT DOCUMENTS

| | | |
|---|---|---|
| 2016/0031554 A1* | 2/2016 | Eshkenazy ............. B64U 10/14 |
| | | 244/6 |
| 2018/0181161 A1 | 6/2018 | Long |
| 2018/0319482 A1 | 11/2018 | Wong |
| 2021/0331791 A1 | 10/2021 | Geuther |
| 2022/0017208 A1 | 1/2022 | Spiegel et al. |
| 2022/0163978 A1 | 5/2022 | Moon |
| 2022/0177114 A1 | 6/2022 | Lam |

OTHER PUBLICATIONS

Invitation to Pay Additional Fees mailed Apr. 19, 2024 for PCT Application No. PCT/US2024/011206, 17 pages.

* cited by examiner

SYSTEM OF AN ELECTRIC AIRCRAFT WITH PITCH CONTROL USING AN ELEVATOR

FIELD OF THE INVENTION

The present invention generally relates to the field of electric aircraft. In particular, the present invention is directed to an electric aircraft with pitch control using an elevator.

BACKGROUND

Electric aircraft presents a great promise for the future. Specifically, electric aircraft will allow human flight to be performed without need to burn fossil fuels. Controlling an electric aircraft steady against airflow during a flight is challenging. The existing solutions to this problem are not sufficient.

SUMMARY OF THE DISCLOSURE

In an aspect, a system of an electric aircraft with pitch control using an elevator is presented. In some embodiments, the electric aircraft may include an elevator configured to deflect. In some embodiments, the electric aircraft may further include a lift lever configured to generate a lift command upon activation by a pilot. In some embodiments, the electric aircraft may further include a flight controller communicatively connected with the lift lever and the elevator, wherein the flight controller is configured to receive the lift command from the lift lever and adjust the elevator as a function of the lift command.

In another aspect, a method of controlling pitch of an electric aircraft using an elevator is presented. In some embodiments, the method may include receiving, using a flight controller incorporated in an electric aircraft, a lift command from a lift lever incorporated in the electric aircraft. The method may further include adjusting, using the flight controller, an elevator as a function of the lift command.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

At a high level, aspects of the present disclosure are directed to a system of an electric aircraft with pitch control using an elevator. Pitch control may help the aircraft to descend or ascend. Controlling of pitch may be done by adjusting the elevator which may present at the rear side of the aircraft. Elevators are Flight Control Surfaces (FCS). Aircraft pitch may be driven based on longitudinal dynamics. In some embodiments, the electric aircraft may further include a lift lever configured to generate a lift command upon activation by a pilot. In some embodiments, the electric aircraft may further include a flight controller communicatively connected with the lift lever and the elevator, wherein the flight controller is configured to receive the lift command from the lift lever and adjust the elevator as a function of the lift command. Exemplary embodiments illustrating aspects of the present disclosure are described below in the context of several specific examples.

Figure 1:
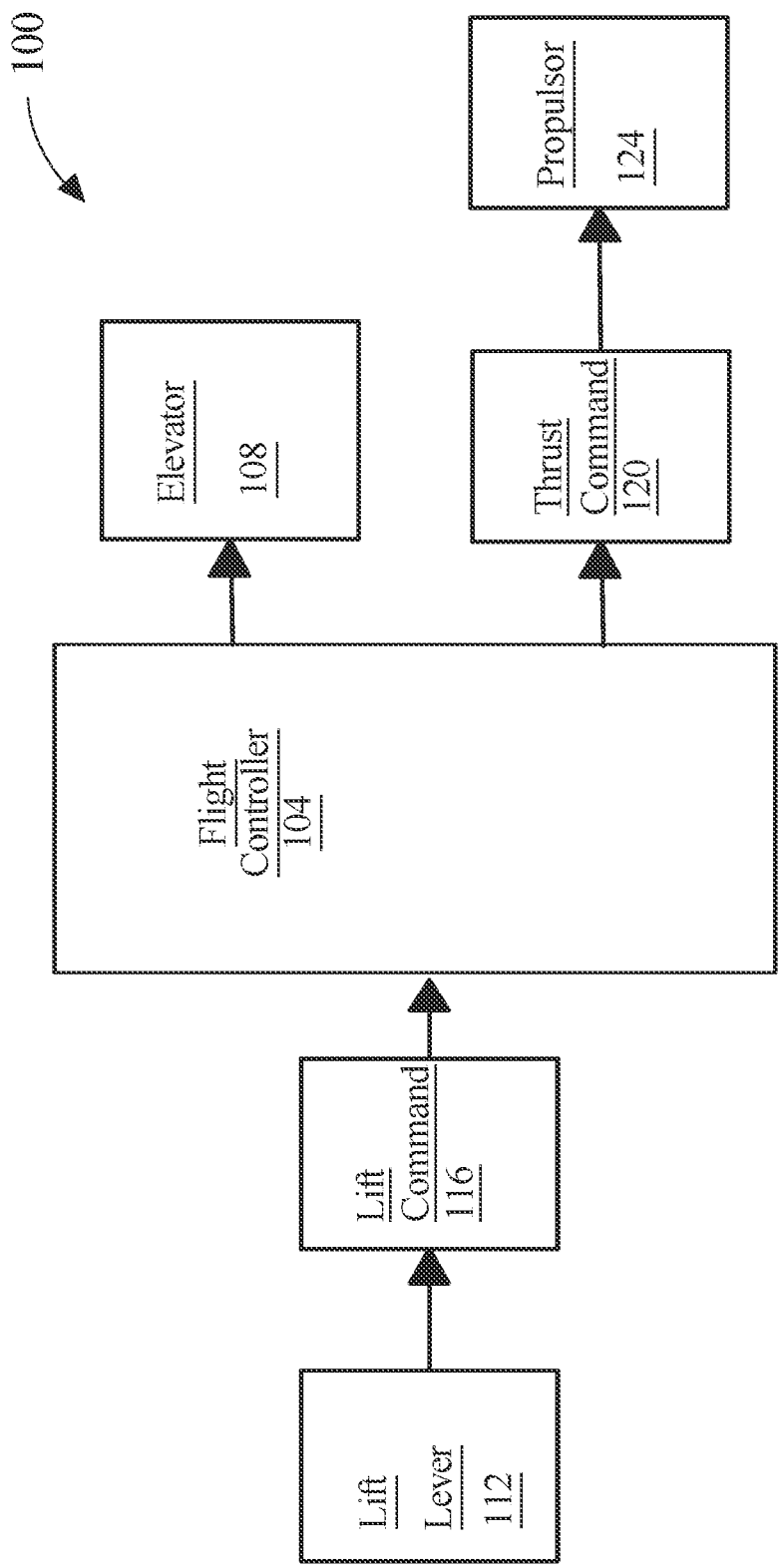
FIG. 1 is a block diagram of a system of an electric aircraft with pitch control using an elevator.

Referring now to FIG. 1, a block diagram of system 100 of controlling a pitch of an electric aircraft is presented. System includes a flight controller 104. Flight controller 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Flight controller 104 may include a single computing device operating independently, or may include two or more computing device operating in concert, in parallel, sequentially or the like; two or more computing devices may be included together in a single computing device or in two or more computing devices. Flight controller 104 may interface or communicate with one or more additional devices as described below in further detail via a network interface device. Network interface device may be utilized for connecting flight controller 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Flight controller 104 may include but is not limited to, for example, a computing device or cluster of computing devices in a first location and a second computing device or cluster of computing devices in a second location. Flight controller 104 may include one or more computing devices dedicated to data storage, security, distribution of traffic for load balancing, and the like. flight controller 104 may distribute one or more computing tasks as described below across a plurality of computing devices of computing device, which may operate in parallel, in series, redundantly, or in any other manner used for distribution of tasks or memory between computing devices. Flight controller 104 may be implemented using a "shared nothing" architecture in which data is cached at the worker, in an embodiment, this may enable scalability of an aircraft and/or computing device.

Still referring to FIG. 1, in some embodiments, flight controller 104 may be designed and/or configured to perform any method, method step, or sequence of method steps in any embodiment described in this disclosure, in any order and with any degree of repetition. For instance, flight controller 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, in some embodiments, system 100 may include an electric aircraft. As used in this disclosure an "aircraft" is vehicle that may fly. As a non-limiting example, an aircraft may include airplanes, helicopters, airships, blimps, gliders, paramotors, and the like thereof. As used in this disclosure, an "electric aircraft" is an aircraft that is electrically powered. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generates lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 1, in some embodiments, electric aircraft may be an electric vertical takeoff and landing (eVTOL) aircraft. An "eVTOL," for the purposes of this disclosure, is an electric aircraft that can hover, take off, and land vertically. An eVTOL, as used herein, is an electrically powered aircraft typically using an energy source of a plurality of energy sources to power the aircraft. In order to optimize the power and energy necessary to propel the aircraft, eVTOL may be capable of rotor-based cruising flight, rotor-based takeoff, rotor-based landing, fixed-wing cruising flight, airplane-style takeoff, airplane-style landing, and/or any combination thereof. A "energy source" may include a plurality of energy sources, referred to herein as a module of energy sources. Module may include batteries connected in parallel or in series or a plurality of modules connected either in series or in parallel designed to satisfy both power and energy requirements. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference. The eVTOL aircraft may include a flight transition point. The flight transition point, as used in this disclosure, is a point where an eVTOL aircraft change its flight mode from vertical flight to forward flight. Vertical flight mode, as used in this disclosure, refers to a mode of an aircraft to propel an aircraft in a vertical direction, such as but not limited to vertical takeoff, vertical landing, and the like. Vertical propulsor may be used to perform vertical flight. The vertical propulsor is further disclosed below. Forward flight mode, as used in this disclosure, refers to a mode of an aircraft to propel an aircraft in a horizontal direction, such as but not limited to "airplane" mode. Forward propulsor may be used to perform forward flight. The forward propulsor is further disclosed below.

Still referring to FIG. 1, in some embodiments, system 100 may include elevator 108. An "elevator," as used in this disclosure, is a primary flight control surface that controls movement about the lateral axis of an aircraft, wherein the movement may be but not limited to pitch. In an embodiment, an aircraft may include one elevator 108. In another embodiment, the aircraft may include two or more elevators 108. In an embodiment, elevator 108 may deflect downward. In another embodiment, elevator 108 may deflect upward. In an embodiment, two or more elevators 108 may deflect synchronously and/or symmetrically. In another embodiment, two or more elevators 108 may deflect asynchronously and/or unsymmetrically. As a non-limiting example, one elevator 108 may deflect upward while another elevator 108 deflects downward. As another non-limiting example, an aircraft may have provisions to disconnect the each of elevators from one another in the event of a control surface jam. In an embodiment, elevator 108 may be deflected manually upon an activation by a pilot. "Manual control," as used in this disclosure, refers to a control, whereby movement of a controlled device is activated by manual manipulation of a controlling device directly connected to a controlled device by an operator, such as but not limited to a pilot, by means of a mechanical, hydraulic, or electrical transmission. As a non-limiting example, a pilot may control an elevator lever to deflect elevator 108 manually. An elevator lever, as used in this disclosure, is a lever or a button that is configured to control elevator movement of an aircraft. In another embodiment, elevator 108 may be deflected simultaneously as the propulsor is activated as a function of lift command 116. As a non-limiting example, elevator 108 may deflect downward as a vertical propulsor is activated to increase lift, resulting a pitch down moment of an aircraft. As another non-limiting example, elevator 108 may deflect upward as a vertical propulsor is activated to increase drag, resulting a pitch up moment of an aircraft. Lift lever 112 is further disclosed below.

Still referring to FIG. 1, in some embodiments, elevator 108 may generate a lift. In some embodiments, the decrease in camber by extending elevator 108 upward may increase lift around the camber, which may be beneficial during approach and taking off as it may allow an aircraft to ascend at a steeper angle. A "lift," for the purposes of this disclosure, is an aerodynamic force, generated by a solid body moving through a fluid, such as air, perpendicular to the relative freestream velocity. The lift generated by an airfoil may depend on speed of airflow, density of air, total area of an airfoil and/or segment thereof, and/or an angle of attack between air and the airfoil. An "airfoil," as used in this disclosure, is a cross-sectional shape of an object whose motion through a gas is capable of generating significant lift, such as, but not limited to, a wing, a sail, blades of propeller, rotor, or turbine, or the like. An "angle of attack," as used in this disclosure, is the angle between a reference line on a body, such as, but not limited to, chord line of an airfoil, and the vector representing the relative motion between the body and the fluid through which it is moving. A "chord line," as used in this disclosure, is an imaginary straight line joining the leading edge and trailing edge of an airfoil. In an embodiment, and without limitation, angle of attack may include a fixed angle of attack. As used in this disclosure, a "fixed angle of attack" is fixed angle between a chord line of an airfoil and relative wind. As used in this disclosure, a "fixed angle" is an angle that is secured and/or unmovable from the attachment point. For example, and without limitation, fixed angle of attack may be 3.2° as a function of a pitch angle of 9.7° and a relative wind angle 6.5°. A "pitch angle," as used in this disclosure, is an angle between a longitudinal axis of an aircraft and horizon. "Horizon," as used in this disclosure, is an apparent line that separates surface of a celestial body from its sky when viewed from a perspective of an observer on or near surface of the relevant body. As a non-limiting example, an aircraft may pitch "up" when its nose is angled upward compared to horizontal flight, as in a climb maneuver. As another non-limiting example, an aircraft may pitch "down", when its nose is angled downward compared to horizontal flight, like in a dive maneuver. In another embodiment, and without limitation, angle of attack may include a variable angle of attack. As used in this disclosure, a "variable angle of attack" is a variable and/or moveable angle between a chord line of an airfoil and relative wind. As used in this disclosure, a "variable angle" is an angle that is moveable from an attachment point. For example, and without limitation variable angle of attack may be a first angle of 4.7° as a function of a pitch angle of 7.1° and a relative wind angle 2.4°, wherein the angle adjusts and/or shifts to a second angle of 2.7° as a function of a pitch angle of 5.1° and a relative wind angle 2.4°. In an embodiment, angle of attack may produce a fixed pitch angle. As used in this disclosure, a "fixed pitch angle" is a fixed angle between a cord line of an airfoil and the rotational velocity direction. For example, and without limitation, fixed pitch angle may include 18°. In another embodiment fixed angle of attack may be manually variable to a few set positions to adjust one or more lifts of the aircraft prior to flight. Additional disclosure related angle of attack may be found in U.S. patent application Ser. No. 17/383,703, filed on Jul. 23, 2021, and entitled "A SYSTEM AND METHOD FOR FLIGHT CONTROL OF AN ELECTRIC VERTICAL TAKEOFF AND LANDING AIRCRAFT" the entirety of which is incorporated by reference herein in its entirety.

Still referring to FIG. 1, in some embodiments, elevator 108 may generate a drag. In some embodiments, the increase in camber by extending elevator 108 downward may increase tail drag, which may be beneficial during approach and landing as it may allow an aircraft to descend at a steeper angle. A "drag," for the purposes of this disclosure, is aerodynamic force that opposes a motion of an aircraft through air. In an embodiment, drag may include skin friction. "Skin friction," as used in this disclosure, is friction between molecules of air and solid surface of an aircraft. The magnitude of the skin friction may depend on properties of both solid and gas. For the solid, in some embodiments, a smooth, waxed surface may produce less skin friction than a roughened surface. For the gas, in some embodiments, the magnitude may depend on the viscosity of the air and the relative magnitude of the viscous forces to the motion of the flow, expressed as the Reynolds number. In another embodiment, the drag may include form drag, wherein form drag is a drag that is depended on a shape of an aircraft. In another embodiment, the drag may include induced drag, wherein induced drag that occurs when distribution of lift is not uniform on a tail. In another embodiment, the drag may include wave drag, wherein wave drag occurs when there is formation of shock waves. Shock waves may be generated along surface of an aircraft when an aircraft approaches the speed of sound. The shock waves may produce a change in static pressure and a loss of total pressure. The magnitude of wave drag may depend on Mach number of flow. In some embodiments, the drag may include ram drag, wherein the ram drag is produced when free stream air is brought inside of an aircraft. As a non-limiting example, jet engines may bring air on board, mix the air with fuel, burn the fuel, then exhaust the combustion products to produce thrust. In some embodiments, the drag may include drag coefficient, wherein the drag coefficient is a dimensionless quantity that is used to quantify the drag or resistance of an object in a fluid environment, such as air.

In some embodiments, aerodynamic efficiency of elevator 108 may be expressed as its lift-to-drag ratio. A "lift-to-drag ratio (L/D ratio)," as used in this disclosure, is a rate of change of lift and drag with angle of attack. The lift disclosed here will be described in further detail below. The drag disclosed here will be described in further detail below. The L/D ratio may be plotted as lift coefficients, $C_L$ divided by drag coefficient, $C_D$: L/D ratio=$C_L/C_D$. A "lift coefficient," as used in this disclosure, is a dimensionless coefficient that relates lift force, L, generated by a lifting body to the fluid density, $\rho$, around the body, the fluid velocity, u, and an associated reference area, S. A "lifting body," is a foil or a complete foil-bearing body, such as, but not limited to, a fixed-wing aircraft. A "reference area," as used in this disclosure, is a surface area of a reference body. The lift coefficient may be a function of an angle of a body to a flow, its Reynolds number and its Mach number. "Reynolds number," as used in this disclosure, is a ratio of inertial forces to viscous forces occurring in a fluid flow. "Mach number," as used in this disclosure, a ratio of flow velocity past a boundary to the local speed of sound. The lift coefficient may be defined by $$C_L \equiv \frac{L}{qS} = \frac{L}{\frac{1}{2}\rho u^2 S} = \frac{2L}{\rho u^2 S},$$

where q is fluid dynamic pressure. As a non-limiting example, when a Boeing 747 has a lift force generated as 637,190 lb, air density as 0.00058735 slug/ft3, velocity as 871 ft/s, and the reference area as 5,500 ft2, the lift coefficient for Boeing 747 can be calculated approximately as 0.52. A "drag coefficient," as used in this disclosure, is a dimensionless quantity that is used to quantify the drag or resistance of an object in a fluid environment, such as, but not limited to, air. The drag coefficient may be defined by $$C_D = \frac{2F_d}{\rho u^2 A}$$

where; $F_d$ is the drag force, which is the force component in the direction of the flow velocity; $\rho$ is the mass density of the fluid; u is the flow speed of the object relative to the fluid; A is the reference area. As a non-limiting example, when a Boeing 747 has a drag force generated as 36,761 lb, air density as 0.00058735 slug/ft3, velocity as 871 ft/s, and the reference area as 5,500 ft2, the drag coefficient for Boeing 747 can be calculated approximately as 0.03. As a non-limiting example, the lift-to-drag ratio of a Boeing 747 may be calculated by $$\frac{0.52}{0.03} = 17.3.$$

The lift-to-drag ratio may be expressed as 17.3:1.

| Calculated lift-to-drag ratio of different aircrafts | |
| --- | --- |
| Aircraft (conditions) | L/D ratio |
| Wright Flyer | 8.3:1 |
| Airbus A380 (in cruise) | 20:1 |
| Rutan Voyager | 27:1 |
| Cessna 172 (gliding) | 10.9:1 |
| Helicopter (at 100 kn) | 4.5:1 |
| Concorde (takeoff and landing) | 4:1 |
| Virgin Atlantic GlobalFlyer | 37:1 |

Still referring to FIG. 1, in some embodiments, system 100 may include a lift lever 112. In some embodiments, lift lever 112 may be configured to generate lift command 116 upon activation by a pilot. A "lift lever," as used in this disclosure, is a lever that is used to control a lift output of an aircraft. In some embodiments, an aircraft may include one or more lift levers 112. In some embodiments, lift lever 112 may be found in a cockpit of an aircraft. The lift lever 112 may be located, but is not limited to, at the front of a pilot, on the side of a pilot, in the center of a cockpit, and the like. A "cockpit," as used in this disclosure, is an area from which a pilot controls an aircraft. In an embodiment, the cockpit may contain flight instruments, wherein the flight instruments may include a mode control panel (MCP), a primary flight display (PFD), a navigation display (ND), the engine indication and crew alerting system (EICAS), the flight management system (FMS), and the like. In another embodiment, the cockpit may include controls to fly an aircraft. In some embodiments, the cockpit may be in the front, in the middle, in the aft, in the side of an aircraft. "Aft," as used in this disclosure, is a rear of an aircraft. A "pilot," as used in this disclosure, is a person aboard an aircraft who is ultimately responsible for its operation and safety during flight. In some embodiments, an aircraft may include one or more pilots. In some embodiments, an aircraft may include an autopilot, wherein the autopilot is a system used to control a path of an aircraft without requiring constant manual control by a human operator. A "lift command," as used in this disclosure, is a command that adjusts a lift of an aircraft, where a lift is a force that is produced in a vertical direction to oncoming air flow. In some embodiments, lift command 116 generated by a lift lever 112 may generate thrust command 120. Thrust command 120 is further disclosed below.

Still referring to FIG. 1, in some embodiments, rotating lift lever 112 in a first direction may increase a lift and rotating the lift lever 112 in a second direction may decrease the lift. In some embodiments, the lift lever 112 may rotate; for instance, and without limitation, the lift lever 112 may rotate through a substantially vertical plane, such that rotation in a direction a pilot would understand as "up" corresponds to increased lift, while a direction a pilot would understand as "down" corresponds to decreased lift. In some embodiments, the lift lever 112 may rotate through a substantially horizontal plane, such that rotation in a direction a pilot would understand as "left" corresponds to increased lift, while a direction a pilot would understand as "right" corresponds to decreased lift. The range of motion of the lift lever 112 may be adjustable, for instance and without limitation by around 6.0 inches range of motion at the lift lever 112 grip. Lift lever 112 motion may be detected by at least an angular position sensor, a contactless sensor, a Hall effect sensor, or any combination thereof, for instance as described in further detail below. Lift lever 112 sensor may include a plurality of independent sensors, wherein failure of a sensor does not affect the others. "Independent sensors," as used in this disclosure, are sensors that connect to a power source and/or logic circuit independently; in other words, the function of one does not depend on the function of another, so that failure of any sensor or sensors does not affect the function of any other sensor or sensors, enabling a lift lever 112 to continue performing as designed. Detection of lift lever 112 rotation by sensors may result in a change in elevator 108 deflection, which may be signaled using any mechanical electrical signal, such as a voltage-controlled change in elevator 108. In some embodiments, the sensor may transmit motion data of lift lever 112 to flight controller 104. In some embodiments, flight controller 104 may deflect elevator 108 as a function of the motion data of lift lever 112. Persons skilled in the art, upon reviewing the entirety of this disclosure, will be aware of various ways to detect rotation of a lift lever 112 that may be used or included in an aircraft, as used and described herein. Additional disclosure related controlling a lift lever may be found in U.S. patent application Ser. No. 16/929,206, filed on Jul. 15, 2020, and entitled "A HOVER AND THRUST CONTROL ASSEMBLY FOR DUAL-MODE AIRCRAFT" the entirety of which is incorporated by reference herein in its entirety.

Still referring to FIG. 1, in some embodiments, lift lever 112 may use a resistance mechanism, wherein the resistance mechanism may generate a force resisting rotation of lift lever 112. A resistance mechanism may include, as a non-limiting example, a source of friction such as an electromagnetic clutch, magnetic particle clutch, pneumatic clutch, pneumatic brake, hydraulic brake, or a biasing means such as a spring-biased selection position, isometric construction, or any component designed to increase or decrease resistance based on an electrical signal from another component, or from a control circuit such as a logic circuit. Persons skilled in the art, upon reviewing the entirety of this disclosure, will be aware of various ways to apply friction to rotation of at least a lever that may be used or included in an aircraft, as used and described herein. In an embodiment, resistance mechanism may resist rotation of lift lever 112 under influence of gravity, for instance if released by a pilot; in other words, resistance mechanism may generate a force that is greater than the force exerted on a lift lever 112 by gravity. This may prevent lift lever 112 from dropping if accidentally or otherwise released, so that lift is maintained at substantially a level attained prior to release of the lift lever 112. In an embodiment, resistance mechanism may increase resistance of rotation of the lift lever 112 when a linear lift control, as further described below, is moved in one or more directions. Resistance to lift lever 112 may be mediated by a source of friction as described previously; control of resistance may be informed by a plurality of sensors, as described in further detail below, tracking control of the lift lever 112 and a linear thrust control. The detection of a linear lift control may be detected by at least an angular position sensor as described above; a control circuit may determine direction of motion based on input from at least an angular position sensor and may direct resistance mechanism to increase and/or decrease resistance accordingly. Control circuit may include an embedded or attached logic circuit, processor, microcontroller or the like; control circuit may include, be included in, and/or communicate with a flight controller. A flight controller disclosed here will be described in further detail below. Additional disclosure related resistance mechanism may be found in U.S. patent application Ser. No. 16/929,206, filed on Jul. 15, 2020, and entitled "A HOVER AND THRUST CONTROL ASSEMBLY FOR DUAL-MODE AIRCRAFT" the entirety of which is incorporated by reference herein in its entirety.

Still referring to FIG. 1, in some embodiments, an aircraft may include a linear lift control mounted on lift lever 112. A "linear lift control", as used herein, is a manually operable bidirectional lift control restricted to motion about or along a single axis. As a non-limiting example, linear lift control may include a slider, such as a button control that can be moved in a bidirectional range, along a single axis, between a minimal and maximal range. As further a non-limiting example, linear lift control may include a lever, where movement is restricted in a bidirectional rotational axis about a fulcrum like the lift lever 112. As an additional non-limiting example, linear lift control may include a joystick confined to bidirectional movement, such as a manual transmission control in some modern vehicles. As another non-limiting example, linear lift control may include a thumbwheel, or any haptic electrical input device, which may control lift in a linear, bidirectional manner. Additional disclosure related a linear control may be found in U.S. patent application Ser. No. 16/929,206, filed on Jul. 15, 2020, and entitled "A HOVER AND THRUST CONTROL ASSEMBLY FOR DUAL-MODE AIRCRAFT" the entirety of which is incorporated by reference herein in its entirety. Exemplary embodiments of a lift lever and a linear lift control, which may alternatively be referred to as a "linear thrust control," are provided below.

Still referring to FIG. 1, in some embodiments, lift lever 112 may use an angular position sensor. An "angular position sensor," as used in this disclosure, is an electronic device that measures the angular position and/or change in angular position of an object from a reference position, where "angular position" denotes an amount of rotation, as measured for instance in degrees, radians, or the like, from the reference position; detection may be accomplished by detection of changes in a magnetic field, current, or any other electrical feedback mechanism used in aircraft control. Angular position sensor may include at least a contactless sensor. A "contactless sensor," as used in this disclosure is an electronic device that measures angular position, as described above, of an object without being in direct contact with an object. Non-limiting examples of contactless sensor may include sensors that detect and/or measure magnetic flux of a small magnet without contact, such as diametric magnetization sensors, through-hole sensors, above-the-object sensors, end-of-shaft sensors, computing angular information from the vectoral components of the flux density from which an output signal (analogue, PWM, or Serial Protocol) proportional to the angle that is produced. As a further non-limiting example, sensor may include at least a Hall effect sensor 312. A Hall effect sensor may include any device that is used to measure the magnitude of a magnetic field where the output voltage is directly proportional to the magnetic field's strength. A Hall effect sensor may be used for proximity sensing, movement and speed detection, and/or current sensing. Non-limiting examples of Hall effect sensors used for detecting position and movement of wheels or shafts may include sensors used in internal combustion engine ignition timing, tachometers, anti-lock braking systems, and brushless DC electric motors where a Hall effect sensor detects the position of magnetic component, where output voltage of the sensor peaks and decreases as magnetic components move closer or away from the sensor, respectively.

Still referring to FIG. 1, system 100 may include propulsor 124 to propel an aircraft. A "propulsor," as used herein, is a component or device used to propel a craft by exerting force on a fluid medium, which may include a gaseous medium such as air or a liquid medium such as water. In an embodiment, an aircraft may include a vertical propulsor. A vertical propulsor is a propulsor 124 that propels an aircraft in an upward direction; one or more vertical propulsors may be mounted on the front, on the wings, at the rear, and/or any suitable location. A vertical propulsor is a propulsor 124 that generates a substantially downward thrust, tending to propel an aircraft in a vertical direction providing thrust for maneuvers such as without limitation, vertical take-off, vertical landing, hovering, and/or rotor-based flight such as "quadcopter" or similar styles of flight. A vertical propulsor includes a thrust element. At least a thrust element may include any device or component that converts the mechanical energy of a motor, for instance in the form of rotational motion of a shaft, into thrust in a fluid medium. At least a thrust element may include, without limitation, a device using moving or rotating foils, including without limitation one or more rotors, an airscrew or propeller, a set of airscrews or propellers such as contra-rotating propellers, a moving or flapping wing, or the like. At least a thrust element may include without limitation a marine propeller or screw, an impeller, a turbine, a pump-jet, a paddle or paddle-based device, or the like. As another non-limiting example, at least a thrust element may include an eight-bladed pusher propeller, such as an eight-bladed propeller mounted behind the engine to ensure the drive shaft is in compression. Propulsors 124 may include at least a motor mechanically coupled to a propulsor as a source of thrust. A motor may include without limitation, any electric motor, where an electric motor is a device that converts electrical energy into mechanical energy, for instance by causing a shaft to rotate. At least a motor may be driven by direct current (DC) electric power; for instance, at least a first motor may include a brushed DC at least a first motor, or the like. At least a first motor may be driven by electric power having varying or reversing voltage levels, such as alternating current (AC) power as produced by an alternating current generator and/or inverter, or otherwise varying power, such as produced by a switching power source. At least a first motor may include, without limitation, brushless DC electric motors, permanent magnet synchronous at least a first motor, switched reluctance motors, or induction motors. In addition to inverter and/or a switching power source, a circuit driving at least a first motor may include electronic speed controllers or other components for regulating motor speed, rotation direction, and/or dynamic braking. Persons skilled in the art, upon reviewing the entirety of this disclosure, will be aware of various devices that may be used as at least a thrust element. Additional disclosure related a propulsor may be found in U.S. patent application Ser. No. 16/929,206, filed on Jul. 15, 2020, and entitled "A HOVER AND THRUST CONTROL ASSEMBLY FOR DUAL-MODE AIRCRAFT" the entirety of which is incorporated by reference herein in its entirety. In another embodiment, propulsor 124 may include a forward propulsor. Forward in this context is not an indication of the propulsor position on the aircraft; one or more propulsors mounted on the front, on the wings, at the rear, etc. A forward propulsor may include one or more propulsors mounted on the front, on the wings, at the rear, or a combination of any such positions. A forward propulsor may propel an aircraft forward for fixed-wing and/or "airplane"-style flight, takeoff, and/or landing, and/or may propel the aircraft forward or backward on the ground.

Still referring to FIG. 1, in some embodiments, propulsor 124 may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure.

Still referring to FIG. 1, an aircraft may include a flight controller 104. In some embodiments, flight controller 104 may be communicatively connected with lift lever 112. Flight controller 104 may be a computing device as disclosed in further detail below. Flight controller 104 may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Flight controller 104 may be designed and configured to operate electronic aircraft via fly-by-wire. As used in this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, in some embodiments, flight controller 104 may be configured to receive lift command 116 from the lift lever 112. Receiving, as used in this disclosure, may include receiving one or more electrical signals transmitted wirelessly or through a wired connection. In some embodiments, lift command 116 may include a command to increase a lift. As a non-limiting example, a pilot may push a lift lever 112 up 30 degrees to send a lift command 116 to flight controller 104 to increase a lift. As another non-limiting example, a pilot may push a lift lever 112 up 60 degrees to send a lift command 116 to flight controller 104 to increase a lift. In some embodiments, lift command 116 may include a command to increase a drag. As a non-limiting example, a pilot may push a lift lever 112 down 30 degrees to send lift command 116 to flight controller 104 to decrease a lift. As another non-limiting example, a pilot may push a lift lever 112 down 30 degrees to send a lift command 116 to flight controller 104 to decrease a lift.

Still referring to FIG. 1, in some embodiments, flight controller 104 is configured to generate thrust command 120 as a function of lift command 116. A "thrust command," as used in this disclosure, is a command to adjust a thrust, where a thrust is a mechanical force which moves an aircraft through air. The thrust may be generated through a reaction of accelerating energy. In an embodiment, the thrust command 120 may include a forward thrust command. As used in this disclosure a "forward thrust" is a thrust that forces an aircraft through a medium, such as a relative air surrounding an aircraft. For example, forward thrust may include a thrust of 111 N directed towards the rear of an aircraft to at least force aircraft to be propelled forward. As used in this disclosure a "relative air" is an external medium that surrounds an aircraft. In another embodiment, thrust command 120 may include a reverse thrust command. As used in this disclosure, a "reverse thrust command" is a command to perform a thrust that forces a medium towards the relative air opposing an aircraft. The reverse thrust command may generate a thrust in an opposite direction to a forward thrust command 120. For example, reverse thrust command may include a thrust of 180 N directed towards the nose of aircraft to at least repel and/or oppose the relative air. Reverse thrust command may alternatively or additionally include any reverse thrust command 120 as described in U.S. Nonprovisional application Ser. No. 17/319,155, filed on May 13, 2021, and entitled "AIRCRAFT HAVING REVERSE THRUST CAPABILITIES," the entirety of which is incorporated herein by reference. In some embodiments, thrust command 120 may include vertical thrust command. A "vertical thrust command."

Still referring to FIG. 1, in some embodiments, thrust command 120 may be generated by calculating a thrust-toweight ratio and comparing the ratio to measure how much thrust is needed to generate a lift commanded by lift command 116. "Thrust-to-weight ratio," as used in this disclosure, is a dimensionless ratio of thrust to weight of a rocket, jet engine, propeller engine, or a vehicle propelled by such an engine that is an indicator of the performance of the engine or vehicle. The thrust-to-weight ratio is calculated by dividing the thrust (newtons) by the weight (newtons) of the engine or vehicle. The thrust-to-weight ratio varies continually during a flight. Thrust varies with throttle setting, airspeed, altitude and air temperature. Weight varies with fuel burn and payload changes. For aircraft, the quoted thrust-to-weight ratio is often the maximum static thrust at sea level divided by the maximum takeoff weight. Aircraft with thrust-to-weight ratio greater than 1:1 can pitch straight up and maintain airspeed until performance decreases at higher altitude. In cruising flight, the thrust-to-weight ratio of an aircraft is the inverse of the lift-to-drag ratio because thrust is the opposite of drag, and weight is the opposite of lift. A plane can take off even if the thrust is less than its weight: if the lift to drag ratio is greater than 1, the thrust to weight ratio can be less than 1, i.e. less thrust is needed to lift the plane off the ground than the weight of the plane.

$$\frac{T}{W} = \frac{D}{L} = \frac{1}{\left(\frac{L}{D}\right)},$$

where T is maximum static thrust, W is maximum takeoff weight, D is drag coefficient, and L is lift coefficient. For propeller-driven aircraft, such as but not limited to eVTOL aircraft, the thrust-to-weight ratio can be calculated as follows:

$$\frac{T}{W} = \frac{550\eta_p}{V}\frac{hp}{W},$$

where $\eta_p$ is propulsive efficiency, hp is the engine's shaft horsepower, and V is true airspeed in feet per second.

Calculated thrust-to-weight ratio of different aircrafts

| Vehicle | Thrust-Weight Ratio | Notes |
|---|---|---|
| Northrop Grumman B-2 Spirit | 0.205 | Max take-off weight, full power |
| Airbus A340 | 0.2229 | Max take-off weight, full power (A340-300 Enhanced) |
| Airbus A380 | 0.227 | Max take-off weight, full power |
| Boeing 747-8 | 0.269 | Max take-off weight, full power |
| Boeing 777 | 0.285 | Max take-off weight, full power (777-200ER) |
| Boeing 737 MAX 8 | 0.310 | Max take-off weight, full power |
| Airbus A320neo | 0.311 | Max take-off weight, full power |
| Boeing 757-200 | 0.341 | Max take-off weight, full power (w/Rolls-Royce RB211) |
| Tupolev 154B | 0.360 | Max take-off weight, full power (w/Kuznecov NK-82) |
| Hawker Siddeley Harrier | 1.1 | VTOL |

Still referring to FIG. 1, in some embodiments, flight controller 104 may generate thrust command 120 by calculating a relationship between a lift and thrust by using lift-to-drag ratio and thrust-to-weight ratio. As a non-limiting example, when lift-to-drag ratio of Boeing 747 is 17.3:1, lift force is 637,190 lb, thrust-to-weight ratio is 0.269 and maximum take-off weight of an aircraft is 700,000 lb, the thrust may be calculated as 10,884 lb. In some embodiments, flight controller 104 may use look-up table to generate thrust command 120. A "lookup table," for the purposes of this disclosure, is an array of data that maps input values to output values. As a non-limiting example, the input values may be amount of lift requested by a pilot according to lift command 116 obtained from lift lever 112 and the output values may be amount of thrust that is needed to generate the requested lift, such as but not limited to thrust command 120. A lookup table may be used to replace a runtime computation with an array indexing operation.

Figure 3:
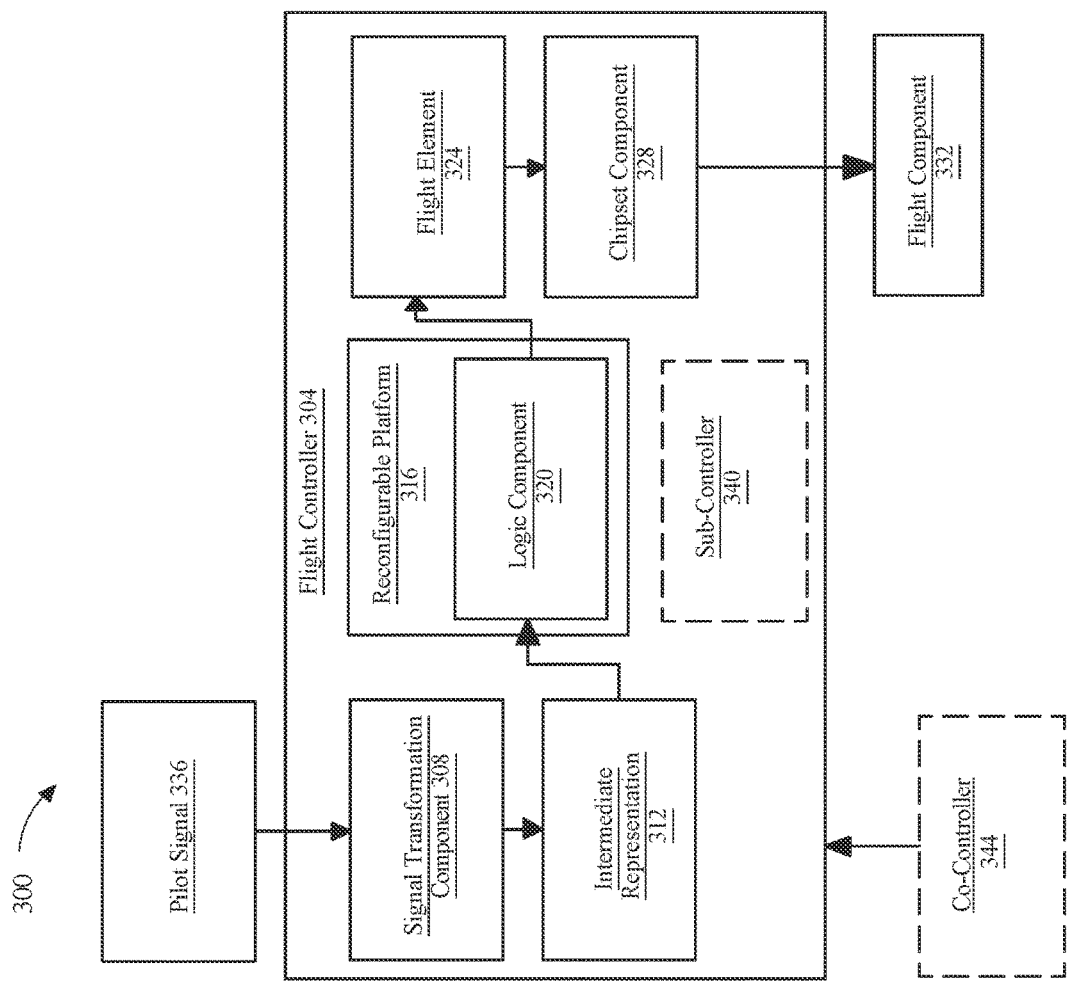
FIG. 3 is a block diagram of an exemplary embodiment of a flight controller.

Still referring to FIG. 3, in some embodiments, flight controller 104 may compute a score associated with each lift command 116 and select thrust command 120 to minimize and/or maximize the score, depending on whether an optimal result is represented, respectively, by a minimal and/or maximal score; a mathematical function, described herein as an "objective function," may be used by flight controller 104 to score each possible pairing. Objective function may based on one or more objectives as described below. In various embodiments a score of a particular thrust command 120 may be based on a combination of one or more factors, including lift command 116. Each factor may be assigned a score based on predetermined variables. In some embodiments, the assigned scores may be weighted or unweighted. In some embodiments, optimization of objective function may include performing a greedy algorithm process. A "greedy algorithm" is defined as an algorithm that selects locally optimal choices, which may or may not generate a globally optimal solution. For instance, flight controller 104 may select thrust command 120 so that scores associated therewith are the best score for each lift command 116.

Still referring to FIG. 1, in some embodiments, objective function may be formulated as a linear objective function, which flight controller 104 may solve using a linear program such as without limitation a mixed-integer program. A "linear program," as used in this disclosure, is a program that optimizes a linear objective function, given at least a constraint. In various embodiments, system 100 may determine thrust command 120 that maximizes a total score subject. A mathematical solver may be implemented to solve for the set lift command 116 that maximizes scores; mathematical solver may implemented on flight controller 104 and/or another device in system 100, and/or may be implemented on third-party solver.

Still referring to FIG. 1, in some embodiments, optimizing objective function may include minimizing a loss function, where a "loss function" is an expression an output of which an optimization algorithm minimizes to generate an optimal result. As a non-limiting example, flight controller 104 may assign variables relating to a set of parameters, which may correspond to score components as described above, calculate an output of mathematical expression using the variables, and select thrust command 120 that produces an output having the lowest size, according to a given definition of "size," of the set of outputs representing each of plurality of candidate ingredient combinations; size may, for instance, included absolute value, numerical size, or the like. Selection of different loss functions may result in identification of different potential pairings as generating minimal outputs.

Still referring to FIG. 1, in some embodiments, flight controller 104 may be communicatively connected to propulsor 124. In some embodiments, flight controller 104 may be configured to transmit thrust command 120 to propulsor

124. As a non-limiting example, flight controller 104 may transmit forward thrust command 120 to propulsor 124. Increasing thrust increases electric energy or power to the vertical propulsor. Decreasing thrust may be accomplished by decreasing electric energy or power to the vertical propulsor. As a non-limiting example, a flight controller 104 may receive lift command 116 from a lift lever, incrementally adjust elevator 108 to increase a lift until a speed of an electric aircraft is low enough to transit from vertical flight to "airplane"-style flight and initiate a vertical propulsor by transmitting forward thrust command to propulsor 124. As another non-limiting example, flight controller 104 may receive lift command 116 from a lift lever 112, incrementally adjust elevator 108 to increase a drag until a speed of an electric aircraft is low enough to transit from "airplane"-style flight to vertical flight and initiate a vertical propulsor by transmitting a forward thrust command 120 to a propulsor 124.

Still referring to FIG. 1, in some embodiments, an aircraft may include a flight controller 104, wherein the flight controller 104 is configured to adjust elevator 108 as a function of lift command 116. In some embodiments, deflection of elevator 108 may be controlled according to an angular deflection value of lift lever 112. As a non-limiting example, lift command 116 may include lift lever excursion. Lift lever excursion, as used in this disclosure, is a rotation of a lift lever from one point to another point. Lift lever excursions may be all mapped to a range that goes from −1 to +1 (interval [−1, +1]). The mapping may depend on the presence of control laws that may alter the final effect of pilot action on the actual elevator 108 deflections and thrust output. As a function of lift lever 112 excurses within interval [−1, +1], interval of angular deflection of elevator oe, may also be [−1, +1], which may be represented as [−oe, +oeJ. Elevator 108 may be deflected proportional to lift lever 112 excursion. The flight controller 104 may deflect elevator 108 downward as the lift command 116 is to increase a lift. Elevator 108 may be deflected up to 15 degrees to produce lift. The flight controller 104 may deflect elevator 108 downward as the lift command 116 is to generate a drag. Elevator 108 may be deflected beyond 15 degrees to increase drag. Elevator 108 may be retracted as a function of a lift command 116. Elevator 108 may deflect in synchronized and symmetrical manner. Elevator 108 may be deflected using actuators. "Actuator," as used in this disclosure, is a component of a machine that is responsible for moving and controlling a mechanism. The mechanism may include dropped hinge, four-bar linkage, upside down four-bar linkage, upside down upright four-bar linkage, complex four-bar linkages, hooked track supports, link track mechanisms, and the like. A "dropped hinged," as used in this disclosure, is a mechanism having a hinge point typically below the fixed point enable to deflect downward. A "four-bar linkage," as used in this disclosure, is the simplest closed-chain movable linkage. The mechanisms may be used with a combination of either linear jackscrew type actuator or rotary actuators. The actuators may include a position sensor, bearings, shaft brake, linear ball screw actuator, rotary actuator, actuator torque limiter, drive arm, angular gearbox, universal joint, shaft, system torque limiter, drive motor, and the like.

Figure 2:
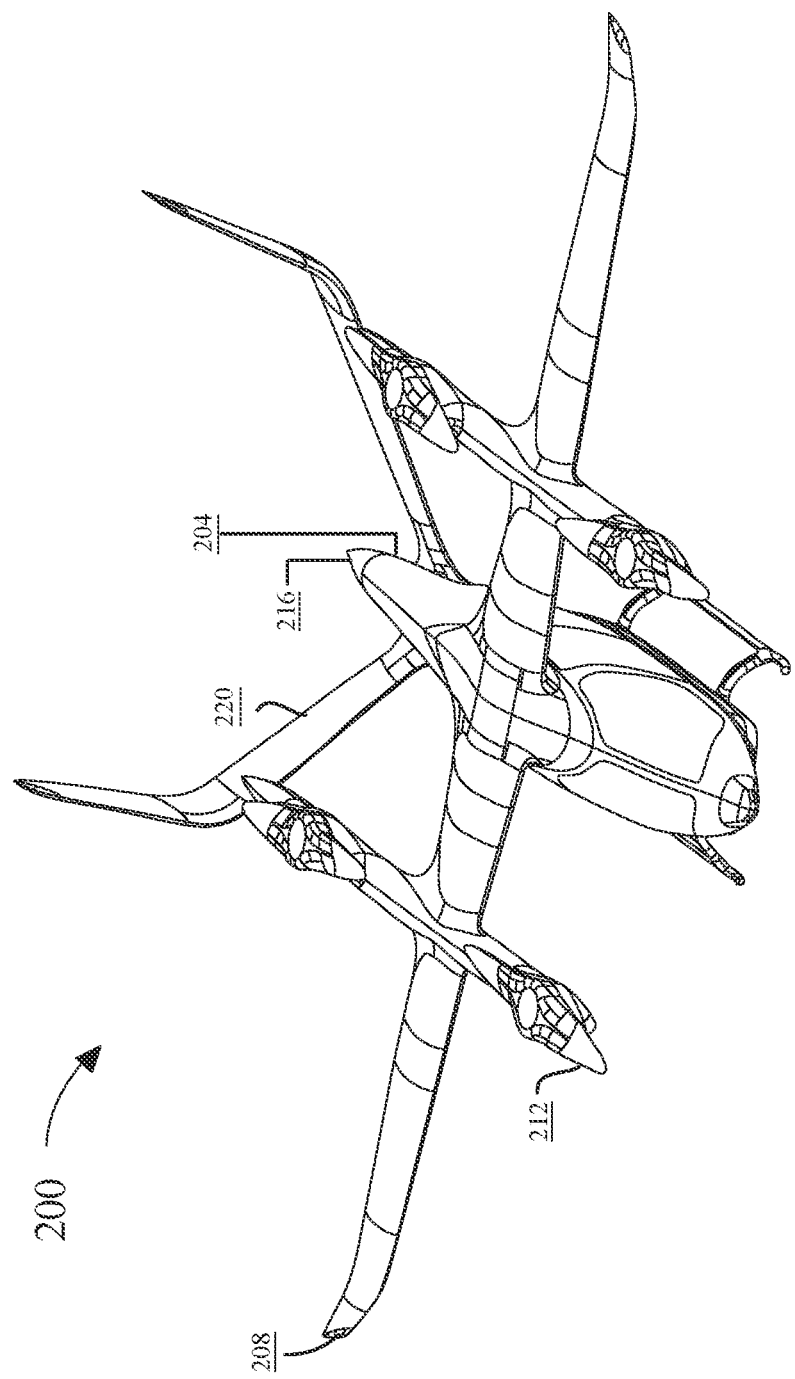
FIG. 2 is a diagrammatic representation of an exemplary embodiment of an aircraft.

Now referring to FIG. 2, an exemplary embodiment 200 of an electric aircraft is illustrated. In an embodiment, and without limitation, electric aircraft may include a fuselage 204. The fuselage 204 may include the entirety of the aircraft except for the cockpit, nose, wings, empennage, nacelles, any and all control surfaces, and generally contains an aircraft's payload. Fuselage 204 may comprise structural elements that physically support the shape and structure of an aircraft. Structural elements may take a plurality of forms, alone or in combination with other types. Structural elements may vary depending on the construction type of aircraft and specifically, the fuselage. Fuselage 204 may comprise a truss structure. A truss structure is often used with a lightweight aircraft and comprises welded steel tube trusses. A truss, as used herein, is an assembly of beams that create a rigid structure, often in combinations of triangles to create three-dimensional shapes. A truss structure may alternatively comprise wood construction in place of steel tubes, or a combination thereof. In embodiments, structural elements may comprise steel tubes and/or wood beams. In an embodiment, and without limitation, structural elements may include an aircraft skin. Aircraft skin may be layered over the body shape constructed by trusses. Aircraft skin may comprise a plurality of materials such as plywood sheets, aluminum, fiberglass, and/or carbon fiber, the latter of which will be addressed in greater detail later in this paper.

Still referring to FIG. 2, in some embodiments, fuselage 204 may comprise geodesic construction. Geodesic structural elements may include stringers wound about formers (which may be alternatively called station frames) in opposing spiral directions. A stringer, as used herein, is a general structural element that comprises a long, thin, and rigid strip of metal or wood that is mechanically coupled to and spans the distance from, station frame to station frame to create an internal skeleton on which to mechanically couple aircraft skin. A former (or station frame) can include a rigid structural element that is disposed along the length of the interior of fuselage 204 orthogonal to the longitudinal (nose to tail) axis of the aircraft and forms the general shape of fuselage 204. A former may comprise differing cross-sectional shapes at differing locations along fuselage 204, as the former is the structural element that informs the overall shape of a fuselage 204 curvature. In some embodiments, aircraft skin can be anchored to formers and strings such that the outer mold line of the volume encapsulated by the formers and stringers comprises the same shape as electric aircraft when installed. In other words, former(s) may form a fuselage's ribs, and the stringers may form the interstitials between such ribs. The spiral orientation of stringers about formers provides uniform robustness at any point on an aircraft fuselage such that if a portion sustains damage, another portion may remain largely unaffected. Aircraft skin would be mechanically coupled to underlying stringers and formers and may interact with a fluid, such as air, to generate lift and perform maneuvers.

In an embodiment, and still referring to FIG. 2, fuselage 204 may comprise monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may comprise aircraft skin made from plywood layered in varying grain directions, epoxy-impregnated fiberglass, carbon fiber, or any combination thereof.

According to embodiments, fuselage 204 may include a semi-monocoque construction. Semi-monocoque construction, as used herein, is a partial monocoque construction, wherein a monocoque construction is describe above detail. In semi-monocoque construction, fuselage 204 may derive some structural support from stressed aircraft skin and some structural support from underlying frame structure made of structural elements. Formers or station frames can be seen running transverse to the long axis of fuselage 204 with circular cutouts which are generally used in real-world manufacturing for weight savings and for the routing of electrical harnesses and other modern on-board systems. In a semi-monocoque construction, stringers are the thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate that there are numerous methods for mechanical fastening of the aforementioned components like crews, nails, dowels, pins, anchors, adhesives like glue or epoxy, or bolts and nuts, to name a few. A subset of fuselage under the umbrella of semi-monocoque construction is unibody vehicles. Unibody, which is short for "unitized body" or alternatively "unitary construction", vehicles are characterized by a construction in which the body, floor plan, and chassis form a single structure. In the aircraft world, unibody would comprise the internal structural elements like formers and stringers are constructed in one piece, integral to the aircraft skin as well as any floor construction like a deck.

Still referring to FIG. 2, stringers and formers which account for the bulk of any aircraft structure excluding monocoque construction can be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. The location of said stringers greatly informs the type of forces and loads applied to each and every stringer, all of which may be handled by material selection, cross-sectional area, and mechanical coupling methods of each member. The same assessment may be made for formers. In general, formers are significantly larger in cross-sectional area and thickness, depending on location, than stringers. Both stringers and formers may comprise aluminum, aluminum alloys, graphite epoxy composite, steel alloys, titanium, or an undisclosed material alone or in combination.

In an embodiment, and still referring to FIG. 2, stressed skin, when used in semi-monocoque construction is the concept where the skin of an aircraft bears partial, yet significant, load in the overall structural hierarchy. In other words, the internal structure, whether it be a frame of welded tubes, formers and stringers, or some combination, is not sufficiently strong enough by design to bear all loads. The concept of stressed skin is applied in monocoque and semi-monocoque construction methods of fuselage 204. Monocoque comprises only structural skin, and in that sense, aircraft skin undergoes stress by applied aerodynamic fluids imparted by the fluid. Stress as used in continuum mechanics can be described in pound-force per square inch (lbf/in$^2$) or Pascals (Pa). In semi-monocoque construction stressed skin bears part of the aerodynamic loads and additionally imparts force on the underlying structure of stringers and formers.

Still referring to FIG. 2, it should be noted that an illustrative embodiment is presented only, and this disclosure in no way limits the form or construction of electric aircraft. In embodiments, fuselage 204 may be configurable based on the needs of the electric per specific mission or objective. The general arrangement of components, structural elements, and hardware associated with storing and/or moving a payload may be added or removed from fuselage 204 as needed, whether it is stowed manually, automatedly, or removed by personnel altogether. Fuselage 204 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 204 may also be configurable to accept certain specific cargo containers, or a receptable that can, in turn, accept certain cargo containers.

Still referring to FIG. 2, electric aircraft may include a plurality of laterally extending elements 208 attached to fuselage 204. As used in this disclosure a "laterally extending element" is an element that projects essentially horizontally from fuselage, including an outrigger, a spar, and/or a fixed wing that extends from fuselage. Wings may be structures which include airfoils configured to create a pressure differential resulting in lift. Wings may generally dispose on the left and right sides of the aircraft symmetrically, at a point between nose and empennage. Wings may comprise a plurality of geometries in planform view, swept swing, tapered, variable wing, triangular, oblong, elliptical, square, among others. A wing's cross section may geometry comprises an airfoil. In embodiments, the bottom surface of an aircraft can be configured to generate a greater pressure than does the top, resulting in lift. In an embodiment, and without limitation, wing may include a leading edge. As used in this disclosure a "leading edge" is a foremost edge of an airfoil that first intersects with the external medium. For example, and without limitation, leading edge may include one or more edges that may comprise one or more characteristics such as sweep, radius and/or stagnation point, droop, thermal effects, and the like thereof. In an embodiment, and without limitation, wing may include a trailing edge. As used in this disclosure a "trailing edge" is a rear edge of an airfoil. In an embodiment, and without limitation, trailing edge may include an edge capable of controlling the direction of the departing medium from the wing, such that a controlling force is exerted on the aircraft. Laterally extending element 208 may comprise differing and/or similar cross-sectional geometries over its cord length or the length from wing tip to where wing meets the aircraft's body. One or more wings may be symmetrical about the aircraft's longitudinal plane, which comprises the longitudinal or roll axis reaching down the center of the aircraft through the nose and empennage, and the plane's yaw axis. Laterally extending element may comprise controls surfaces configured to be commanded by a pilot or pilots to change a wing's geometry and therefore its interaction with a fluid medium, like air. Control surfaces may comprise flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may comprise a combination of control surfaces to perform maneuvers while flying or on ground.

Still referring to FIG. 2, electric aircraft may include a plurality of lift components 212 attached to the plurality of extending elements 208. As used in this disclosure a "lift component" is a component and/or device used to propel a craft upward by exerting downward force on a fluid medium, which may include a gaseous medium such as air or a liquid medium such as water. Lift component 212 may include any device or component that consumes electrical power on demand to propel an electric aircraft in a direction or other vehicle while on ground or in-flight. For example, and without limitation, lift component 212 may include a rotor, propeller, paddle wheel and the like thereof, wherein a rotor is a component that produces torque along a longitudinal axis, and a propeller produces torquer along a vertical axis. In an embodiment, lift component 212 may include a propulsor. In an embodiment, when a propulsor twists and pulls air behind it, it will, at the same time, push an aircraft forward with an equal amount of force. As a further non-limiting example, lift component 212 may include a thrust element which may be integrated into the propulsor. The thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like. The more air pulled behind an aircraft, the greater the force with which the aircraft is pushed forward.

In an embodiment, and still referring to FIG. 2, lift component 212 may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment lift component 212 may include a rotating power-driven hub, to which are attached several radial airfoil-section blades such that the whole assembly rotates about a longitudinal axis. The blades may be configured at an angle of attack. In an embodiment, and without limitation, angle of attack may include a fixed angle of attack. In some embodiments, lift component 212 may be configured to produce a lift.

Still referring to FIG. 2, electric aircraft may include at least a longitudinal thrust component 216. As used in this disclosure a "longitudinal thrust component" is a flight component that is mounted such that the component thrusts the flight component through a medium. As a non-limiting example, longitudinal thrust flight component 216 may include a pusher flight component such as a pusher propeller, a pusher motor, a pusher propulsor, and the like. Additionally, or alternatively, pusher flight component may include a plurality of pusher flight components. In an embodiment, the pusher propulsor may be located on the back of the aircraft. In another embodiment, the pusher propulsor may be located on the bottom of a fuselage. In some embodiments, the pusher propulsor may be located on the side of the fuselage. In some embodiments, the pusher propulsor may be located on the top of the fuselage. In some embodiments, the pusher propulsor may be mounted on an aircraft wing. In some embodiments, the pusher propulsor may be mounted on an aircraft tail. In an embodiment, the pusher propulsor may provide a thrust to propel the aircraft forward. As a non-limiting example, the pusher propulsor of an electric aircraft may generate a thrust to fly against air flow. As a further non-limiting example, longitudinal thrust flight component may include a puller flight component such as a puller propeller, a puller motor, a puller propulsor, and the like. Additionally, or alternatively, puller flight component may include a plurality of puller flight components. Exemplary electric aircraft configuration is disclosed in detail in U.S. patent application Ser. No. 17/523,199 entitled "SYSTEM AND METHOD FOR AN ELECTRIC AIRCRAFT SIMULATION NETWORK" by S. Donovan et al., which are incorporated in their entirety herein by reference.

Still referring to FIG. 2, in some embodiments, electric aircraft may include elevator 220. In some embodiments, elevator 220 may be consistent with elevator 108. In an embodiment, elevator 220 may be located on the aft of the aircraft. In another embodiment, elevator 220 may be located on an aircraft tail. In another embodiment, elevator 220 may be located on an aircraft wing. In some embodiments, elevator 108 may be mounted on trailing edge of horizontal stabilizer. An aircraft stabilizer is an aerodynamic surface, typically including one or more movable control surfaces, that provides longitudinal (pitch) such as but not limited to a horizontal stabilizer and/or directional (yaw) such as but not limited to a vertical stabilizer stability and control. A stabilizer may feature a fixed or adjustable structure on which any movable control surfaces are hinged, or it may itself be a fully movable surface such as a stabilator.

Now referring to FIG. 3, an exemplary embodiment 300 of a flight controller 304 is illustrated. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field/with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

Still referring to FIG. 3, in an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 2, in some embodiments, pusher propulsor may be mounted to the rear of aircraft 200. For example, in some embodiments, pusher propulsor may be mounted at the location indicated by reference number 216. Pusher propulsor may generate a forward thrust so as to, for example, push the aircraft in a forward direction. For the purposes of this disclosure, the "forward direction" is the direction that the pilot is facing.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component 332 may include a component used to affect the aircrafts' pitch which may comprise one or more aircraft elevator. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, a remote device and/or FPGA may generate autonomous function as a function of an autonomous machine-learning model. As used in this disclosure a "remote device" is an external device to flight controller 304. As used in this disclosure an "autonomous function" is a mode and/or function of flight controller 304 that controls aircraft automatically. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering aircraft elevators, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

In some embodiments, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control an elevator of an electric aircraft. As used in this disclosure "non-autonomous mode" is a mode that denotes a pilot will control aircraft and/or maneuvers of aircraft in its entirety.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive an autonomous function from a remote device and/or FPGA that utilizes one or more autonomous machine learning processes as described above. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally or alternatively, autonomous machine-learning model may include one or more autonomous machine-learning processes that a field-programmable gate array (FPGA) may or may not use in the generation of autonomous function. Additionally or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers.

Still referring to FIG. 3, flight controller may include a sub-controller 340. As used in this disclosure a "sub-controller" is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributer flight controller as described above. For example, and without limitation, co-controller 344 may include one or more controllers and/or components that are similar to flight controller 304. As a further non-limiting example, co-controller 344 may include any controller and/or component that joins flight controller 304 to distributer flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
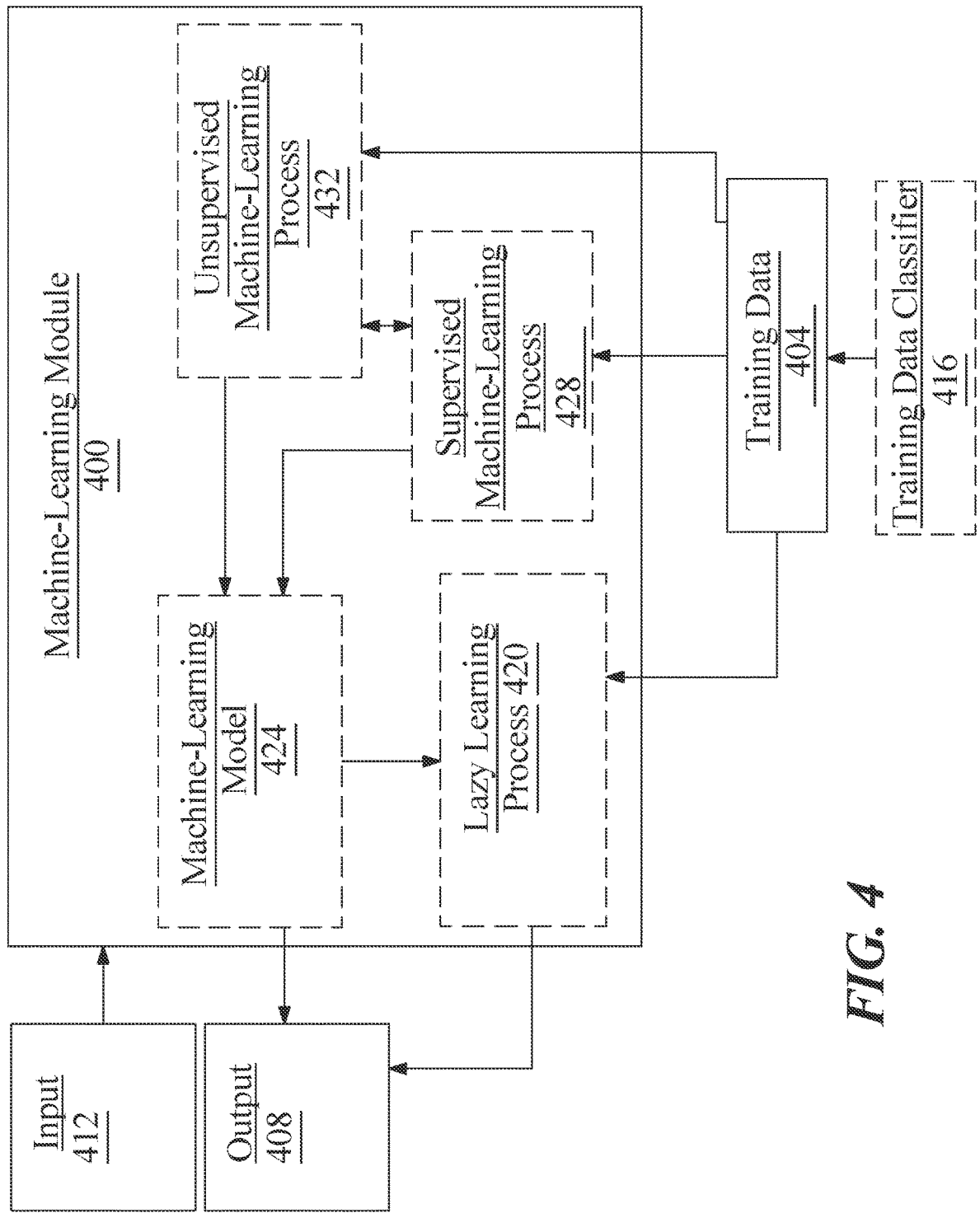
FIG. 4 is a block diagram of an exemplary machine-learning process.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like.

Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
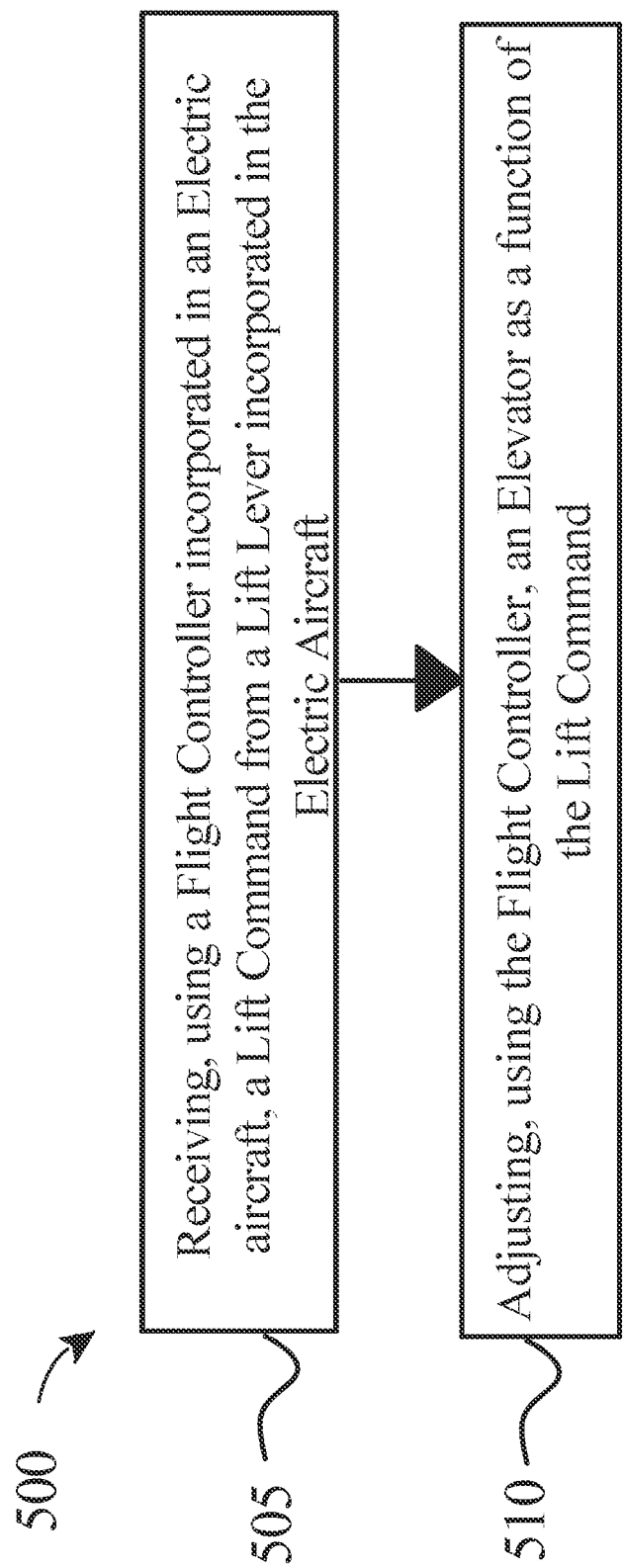
FIG. 5 is a flow diagram illustrating an exemplary method for controlling pitch of an electric aircraft using an elevator.

Referring now to FIG. 5, an exemplary embodiment of method 500, controlling pitch of an electric aircraft using an elevator, is shown. Method 500 includes a step 505 of receiving, using a flight controller incorporated in an electric aircraft, a lift command from a lift lever incorporated in the electric aircraft. The electric aircraft may include an electric vertical takeoff and landing (eVTOL) aircraft. The lift command is configured to generate and adjust a lift. The lift may produce a force in a vertical direction. The electric aircraft may include a propulsor propelling the electric aircraft. The flight controller may further include generating a thrust command as a function of the lift command. The flight controller may further include transmitting the thrust command to the propulsor. This may be implemented as disclosed with reference to FIGS. 1-4.

Still referring to FIG. 5, method 500 includes a step 510 of adjusting, using the flight controller, an elevator as a function of the lift command. In some embodiments, the propulsor may include a vertical propulsor. In an embodiment, the flight controller may further include receiving the lift command from the lift lever, initiate a vertical propulsor and incrementally adjust the elevator to increase the lift until a speed of the electric aircraft is low enough to transit vertical flight. In another embodiment, the flight controller may further include receiving the lift command from the lift lever, initiating the vertical propulsor, and incrementally adjusting the elevator to increase drag until the speed of the electric aircraft is low enough to transit to vertical flight. The elevator may be deflected simultaneously as the propulsor is activated as a function of the lift command. The elevator may be deflected manually upon the activation by a pilot. This may be implemented as disclosed with reference to FIGS. 1-4.

Figure 6:
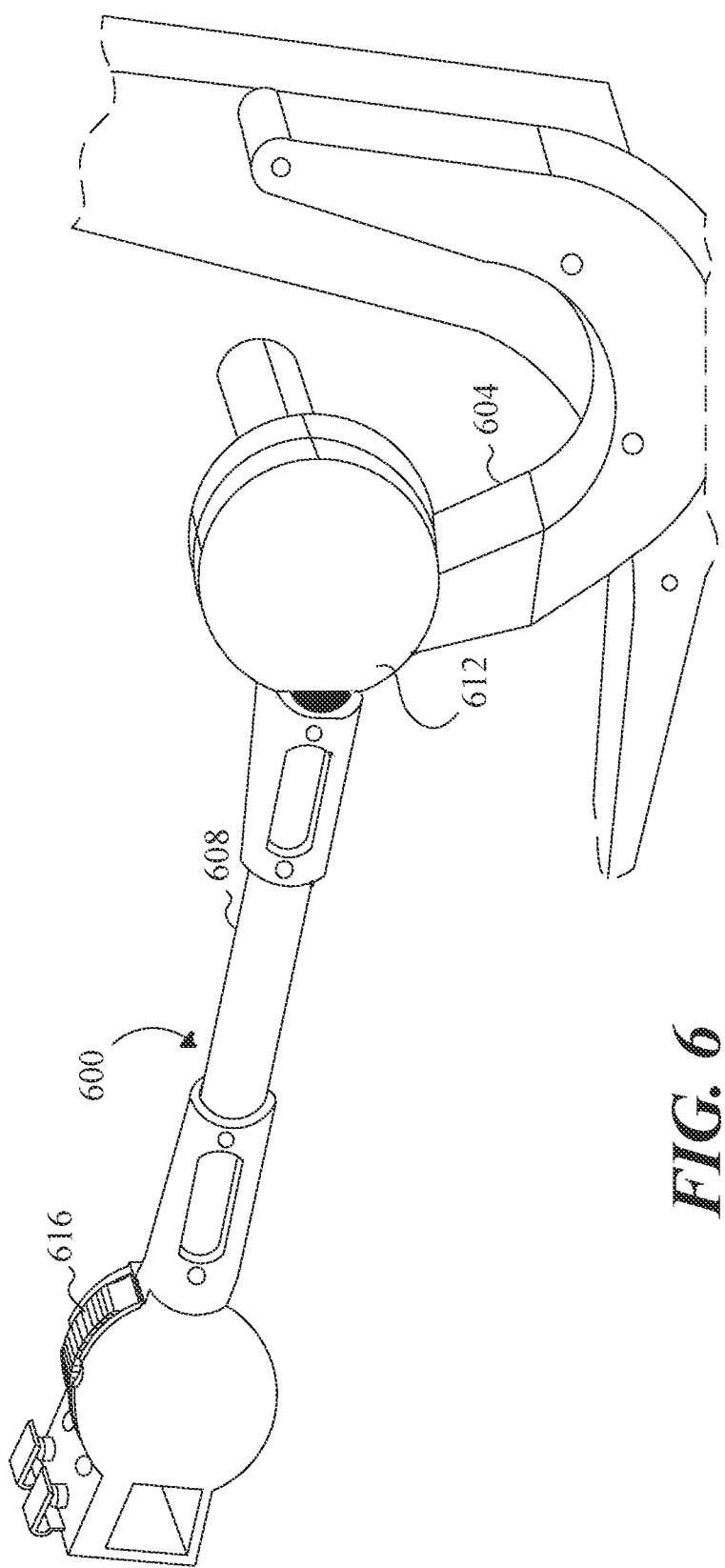
FIG. 6 is a schematic diagram illustrating a hover and thrust control assembly.

Referring now to FIG. 6, an exemplary combined hover and forward thrust control assembly 600 for a dual-mode aircraft system is illustrated. In an embodiment, a support structure 604 may attach the hover and forward thrust assembly 600 to an aircraft frame of an aircraft having at least a vertical propulsor and at least a forward propulsor. In an embodiment, hover and thrust control assembly 600 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, as a non-limiting example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling can be used to connect the ends of adjacent parts and/or objects of an electric aircraft. Further, in an embodiment, mechanical coupling may be used to join two pieces of rotating electric aircraft components.

Referring again to FIG. 6, assembly 600 may include a throttle lever 608 rotatably mounted to the support structure 604. Persons skilled in the art, upon reviewing the entirety of this disclosure, will be aware of many possible features that may function as at least a support structure 604. At least a support structure 604 may be constructed of any suitable material or combination of materials, including without limitation metal such as aluminum, titanium, steel, or the like, polymer materials or composites, fiberglass, carbon fiber, wood, or any other suitable material. As a non-limiting example, support structure may be constructed from additively manufactured polymer material with a carbon fiber exterior; aluminum parts or other elements may be enclosed for structural strength, or for purposes of supporting, for instance, vibration, torque or shear stresses imposed by at least a propulsor. Rotating throttle lever 608 in a first direction increases power to a vertical propulsor and rotating the throttle lever in a second direction decrease power to the vertical propulsor. In illustrative embodiments, throttle lever 608 may rotate; for instance, and without limitation, throttle lever may rotate through a substantially vertical plane, such that rotation in a direction a pilot would understand as "up" corresponds to increased throttle to vertical propulsors, while a direction a pilot would understand as "down" corresponds to decreased throttle. The range of motion of a throttle lever may be adjustable, for instance and without limitation by around 6.0 inches range of motion at the throttle lever grip. Throttle lever 608 motion may be detected by at least an angular position sensor, a contactless sensor, a Hall effect sensor, or any combination thereof, for instance as described in further detail below. Throttle lever 608 sensor may include a plurality of independent sensors, wherein failure of a sensor does not affect the others. "Independent sensors," as used in this disclosure, are sensors that connect to a power source and/or logic circuit independently; in other words, the function of one does not depend on the function of another, so that failure of any sensor or sensors does not affect the function of any other sensor or sensors, enabling thrust lever to continue performing as designed. Rotation of throttle lever 608 may result in increase and/or decrease of throttle by increase or decrease of electrical energy and/or power to at least a vertical propulsor. Detection of throttle lever 608 rotation by sensors in the support structure 604 may result in a change in throttle to vertical thrusters, which may be signaled using any mechanical electrical signal, such as a voltage-controlled change in aircraft throttle. Persons skilled in the art, upon reviewing the entirety of this disclosure, will be aware of various ways to detect rotation of at least a propulsor that may be used or included in system 600 or an electric aircraft, as used and described herein.

Continuing to refer to FIG. 6, throttle lever 608 may include a resistance mechanism 612; the resistance mechanism 612 may generate a force resisting rotation of throttle lever 608. A resistance mechanism 612 may include, as a non-limiting example, a source of friction such as an electromagnetic clutch, magnetic particle clutch, pneumatic clutch, pneumatic brake, hydraulic brake, or a biasing means such as a spring-biased selection position, isometric construction, or any component designed to increase or decrease resistance based on an electrical signal from another component, or from a control circuit such as a logic circuit. Persons skilled in the art, upon reviewing the entirety of this disclosure, will be aware of various ways to apply friction to rotation of at least a lever that may be used or included in assembly 600 or a dual-mode aircraft, as used and described herein. In an embodiment, resistance mechanism 612 may resist rotation of throttle lever 608 under influence of gravity, for instance if released by a pilot; in other words, resistance mechanism 612 may generate a force that is greater than the force exerted on a throttle lever 608 by gravity. This may prevent throttle lever 608 from dropping if accidentally or otherwise released, so that thrust of a vertical propulsor is maintained at substantially a level attained prior to release of the thrust lever 608. In an embodiment, resistance mechanism 612 may increase resistance of rotation of the throttle lever 608 when a linear thrust control, as further described below, is moved in one or more directions. Resistance to throttle lever 608 may be mediated by a source of friction as described previously; control of resistance may informed by a plurality of sensors, as described in further detail below, tracking control of the throttle lever 608 and a linear thrust control. The detection of a linear thrust control may be detected by at least an angular position sensor as described above; a control circuit may determine direction of motion based on input from at least an angular position sensor and direct resistance mechanism to increase and/or decrease resistance accordingly. Control circuit may include an embedded or attached logic circuit, processor, microcontroller or the like; control circuit may include, be included in, and/or communicate with an aircraft controller. Aircraft controller may include and/or communicate with any computing device, including without limitation a microcontroller, microprocessor, digital signal processor (DSP) and/or system on a chip (SoC). Aircraft controller may be programmed to operate electronic aircraft to perform at least a flight maneuver; at least a flight maneuver may include takeoff, landing, stability control maneuvers, emergency response maneuvers, regulation of altitude, roll, pitch, yaw, speed, acceleration, or the like during any phase of flight. At least a flight maneuver may include a flight plan or sequence of maneuvers to be performed during a flight plan. Aircraft controller may be designed and configured to operate electronic aircraft via fly-by-wire. Aircraft controller is communicatively coupled to each propulsor; as used herein, aircraft controller is communicatively coupled to each propulsor where aircraft controller is able to transmit signals to each propulsor and each propulsor is configured to modify an aspect of propulsor behavior in response to the signals. As a non-limiting example, aircraft controller may transmit signals to a propulsor via an electrical circuit connecting aircraft controller to the propulsor; the circuit may include a direct conductive path from aircraft controller to propulsor or may include an isolated coupling such as an optical or inductive coupling. Alternatively, or additionally, aircraft controller may communicate with a propulsor of plurality of propulsors 604a-n using wireless communication, such as without limitation communication performed using electromagnetic radiation including optical and/or radio communication, or communication via magnetic or capacitive coupling. Vehicle controller may be fully incorporated in an electric aircraft containing a propulsor, and may be a remote device operating the electric aircraft remotely via wireless or radio signals, or may be a combination thereof, such as a computing device in the aircraft configured to perform some steps or actions described herein while a remote device is configured to perform other steps. Persons skilled in the art will be aware, after reviewing the entirety of this disclosure, of many different forms and protocols of communication that may be used to communicatively couple aircraft controller to propulsors. Persons skilled in the art, upon reviewing the entirety of this disclosure, will be aware of various ways to monitor resistance levels and apply resistance to linear thrust control, as used and described herein.

Continuing to refer to FIG. 6, a hover and thrust control assembly 600 may include a linear thrust control 616 mounted on the throttle lever 608. A "linear thrust control", as used herein, is a manually operable bidirectional thrust control restricted to motion about or along a single axis. As a non-limiting example, linear thrust control 616 may include a slider, such as a button control that can be moved in a bidirectional range, along a single axis, between a minimal and maximal range. As further a non-limiting example, linear thrust control 616 may include a lever, where movement is restricted in a bidirectional rotational axis about a fulcrum like the throttle lever 608. As an additional non-limiting example, linear thrust control 616 may include a joystick confined to bidirectional movement, such as a manual transmission control in some modern vehicles. As another non-limiting example, linear thrust control 616 may include a thumbwheel, or any haptic electrical input device, which may control thrust in a linear, bidirectional manner. While the illustrative embodiment of FIG. 6 shows hover and thrust control assembly 600 having throttle lever 608 and linear thrust control 616, in other embodiments, hover and thrust control assembly 600 may have any number of flight control elements.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
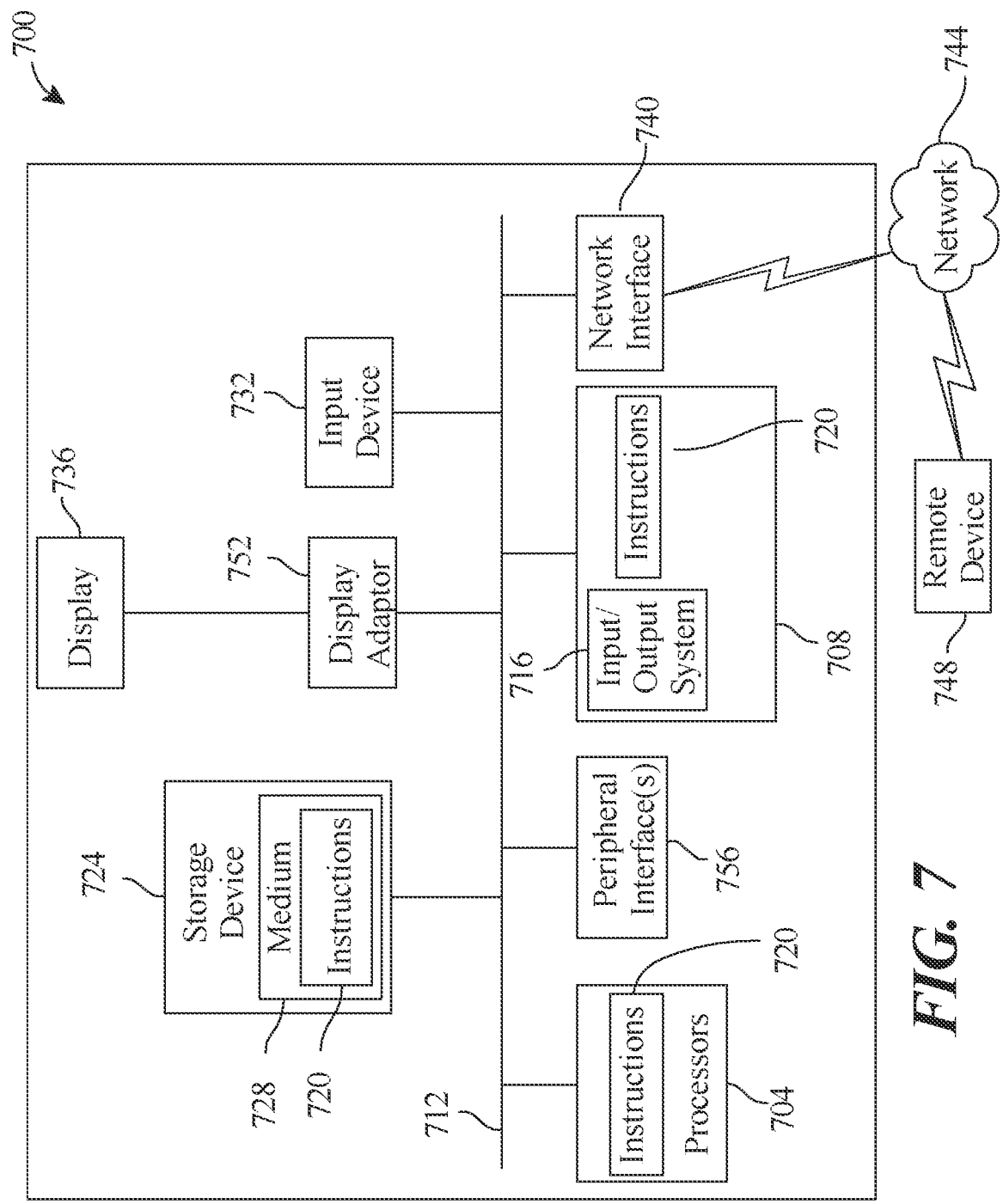
FIG. 7 is a block diagram of a computing system that can be used to implement any one or more of the methodologies disclosed herein and any one or more portions thereof; The drawings are not necessarily to scale and may be illustrated by phantom lines, diagrammatic representations and fragmentary views. In certain instances, details that are not necessary for an understanding of the embodiments or that render other details difficult to perceive may have been omitted.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system of an electric aircraft comprising:
    a plurality of vertical lift propulsors driven by one or more electric motors;
    an elevator coupled with an actuator that causes the elevator to deflect to adjust a pitch of the electric aircraft;
    a lift lever configured to receive an input and output a command in response to the input, wherein the command controls a collective output from the plurality of vertical lift propulsors; and
    a flight controller communicatively connected with the lift lever and the elevator, wherein the flight controller is configured to:
        control, by providing a signal to one or more of the plurality of vertical lift propulsors, a change to a collective thrust generated by the plurality of vertical lift propulsors in response to the command, wherein the command comprises a lift command including a command to increase a drag of the electric aircraft and wherein the flight controller is further configured to provide the signal to incrementally adjust a deflection of the elevator in response to the lift command to change a lift of the electric aircraft until a drag coefficient associated with the electric aircraft is increased by an amount that causes a speed of the electric aircraft to drop below a value associated with safe transition to vertical flight; and
        cause, by providing a signal to the actuator, the elevator to deflect simultaneously as at least one of the plurality of vertical lift propulsors is activated.

2. The system of claim 1, wherein the flight controller is further configured to:
    generate a thrust command in response to the command; and
    transmit the thrust command to the one or more of the plurality of vertical lift propulsors.

3. The system of claim 1, wherein the flight controller is configured to provide the signal to cause the elevator to deflect simultaneously with and in proportion to the lift lever.

4. The system of claim 1, wherein the flight controller is further configured to:
    control a differential thrust to the plurality of vertical lift propulsors to vary an attitude of the electric aircraft; and
    control, by providing a signal to the actuator, the elevator as a function of an altitude control of the electric aircraft.

5. The system of claim 1, wherein:
    deflection of the elevator is controlled in part by the flight controller in response to angular deflection of the lift lever; and
    the elevator deflects downward in response to upward movement of the lift lever.

6. The system of claim 5, wherein deflection of the elevator is further controlled in part by the flight controller in response to attitude commands to control an attitude of the electric aircraft.

7. The system of claim 1, wherein the flight controller is further configured to generate a thrust command as a function of the command, wherein the thrust command is proportional to the command.

8. The system of claim 7, wherein the lift lever comprises a linear thrust control and the thrust command is generated as a function of the linear thrust control.

9. The system of claim 1, wherein the flight controller is further configured to cause the elevator to deflect downward in response to upward movement of the lift lever.

10. The system of claim 1, wherein the lift lever includes a resistance mechanism configured to resist rotation of the lift lever.

11. The system of claim 10, wherein the resistance mechanism is configured to increase resistance against rotation of the lift lever in response to a linear thrust control of the lift lever being actuated.

12. The system of claim 1, wherein increasing the drag coefficient includes causing the elevator to be deflected at least 15 degrees with respect to a wing on which the elevator is coupled to.

13. A method for controlling pitch of an electric aircraft comprising:
  receiving, using a flight controller of the electric aircraft, a lift command including a command to increase a drag of the electric aircraft from a lift lever of the electric aircraft wherein:
    the electric aircraft comprises a plurality of vertical lift propulsors driven by one or more electric motors; and
    the flight controller is configured to control a thrust of the plurality of vertical lift propulsors in response to the lift command;
  adjusting, using the flight controller, an elevator of the electric aircraft as a function of the lift command;
  incrementally adjusting, by the flight controller, a deflection of the elevator to change a lift of the electric aircraft until a drag coefficient associated with the electric aircraft is increased by an amount that causes a speed of the electric aircraft to drop below a value associated with safe transition to vertical flight; and
  causing, by providing a signal to an actuator, the elevator to deflect simultaneously as at least one of the plurality of vertical lift propulsors is activated.

14. The method of claim 13, further comprising:
  generating, using the flight controller, a thrust command as a function of the lift command; and
  transmitting, using the flight controller, the thrust command to the plurality of vertical lift propulsors.

15. The method of claim 13, further comprising
  initiating, by the flight controller, rotation of the plurality of vertical lift propulsors.

16. The method of claim 13, wherein the flight controller is configured to cause the elevator to deflect simultaneously with and in proportion to the lift command.

17. The method of claim 13, further comprising generating a thrust command as a function of the lift command wherein the thrust command comprises a forward thrust command, and wherein:
  the lift lever comprises a linear thrust control; and
  the thrust command is generated as a function of the linear thrust control.

18. An electric aircraft comprising:
  a fuselage;
  a plurality of lateral elements that extends from the fuselage;
  a plurality of vertical lift propulsors driven by one or more electric motors, the plurality of vertical lift propulsors coupled to corresponding ones of the plurality of lateral elements;
  an elevator deflected by an actuator to adjust a pitch of the fuselage;
  a lift lever configured to receive an input indicative of an altitude control and output a command in response to the input, wherein the command controls a collective output from the plurality of vertical lift propulsors; and
  a flight controller communicatively connected with the lift lever and the elevator, wherein the flight controller is configured to:
    control, by providing a signal to the plurality of vertical lift propulsors, an altitude of the electric aircraft;
    cause, by providing a signal to the actuator, the elevator to deflect simultaneously as at least one of the plurality of vertical lift propulsors is activated; and
    incrementally adjust a deflection of the elevator in response to the command to change a lift of the electric aircraft until a drag coefficient associated with the electric aircraft is increased by an amount that causes a speed of the electric aircraft to drop below a value associated with safe transition to vertical flight.

19. The electric aircraft of claim 18, further comprising a forward propulsor coupled to the fuselage and driven by at least one of the one or more electric motors.

20. The electric aircraft of claim 18, wherein the command comprises a lift command and wherein the flight controller is further configured to
  cause the elevator to deflect simultaneously with and in proportion to a change of a thrust rate of the one or more of the plurality of vertical lift propulsors.

* * * * *